Aug. 15, 1933.  P. J. CHRISTMAN  1,922,660
POWER TRANSMISSION
Filed Nov. 11, 1932   2 Sheets-Sheet 2
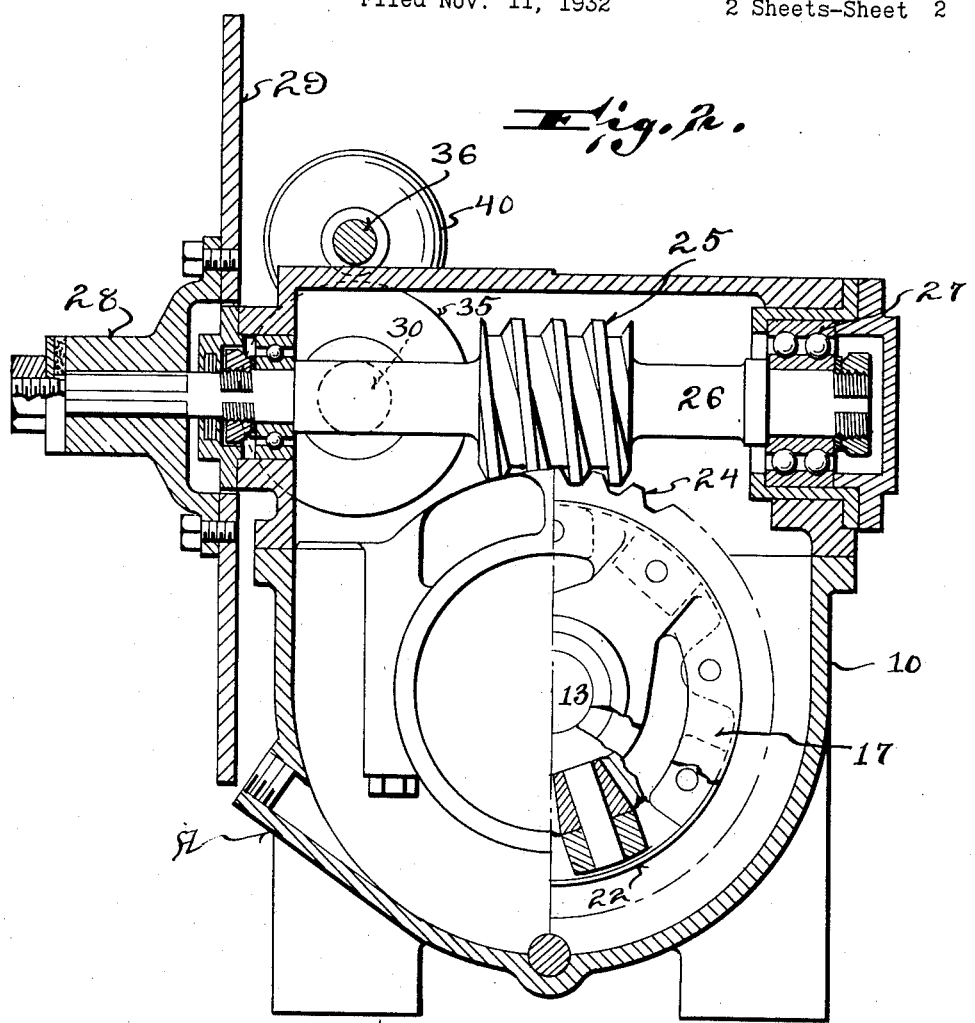
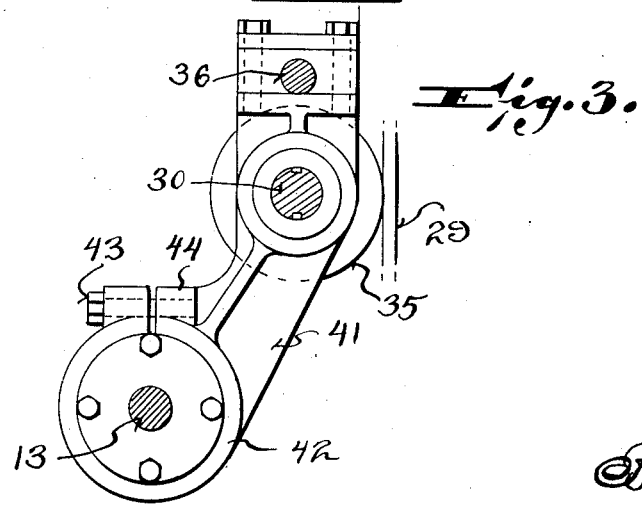
Inventor
P. J. Christman Patented Aug. 15, 1933

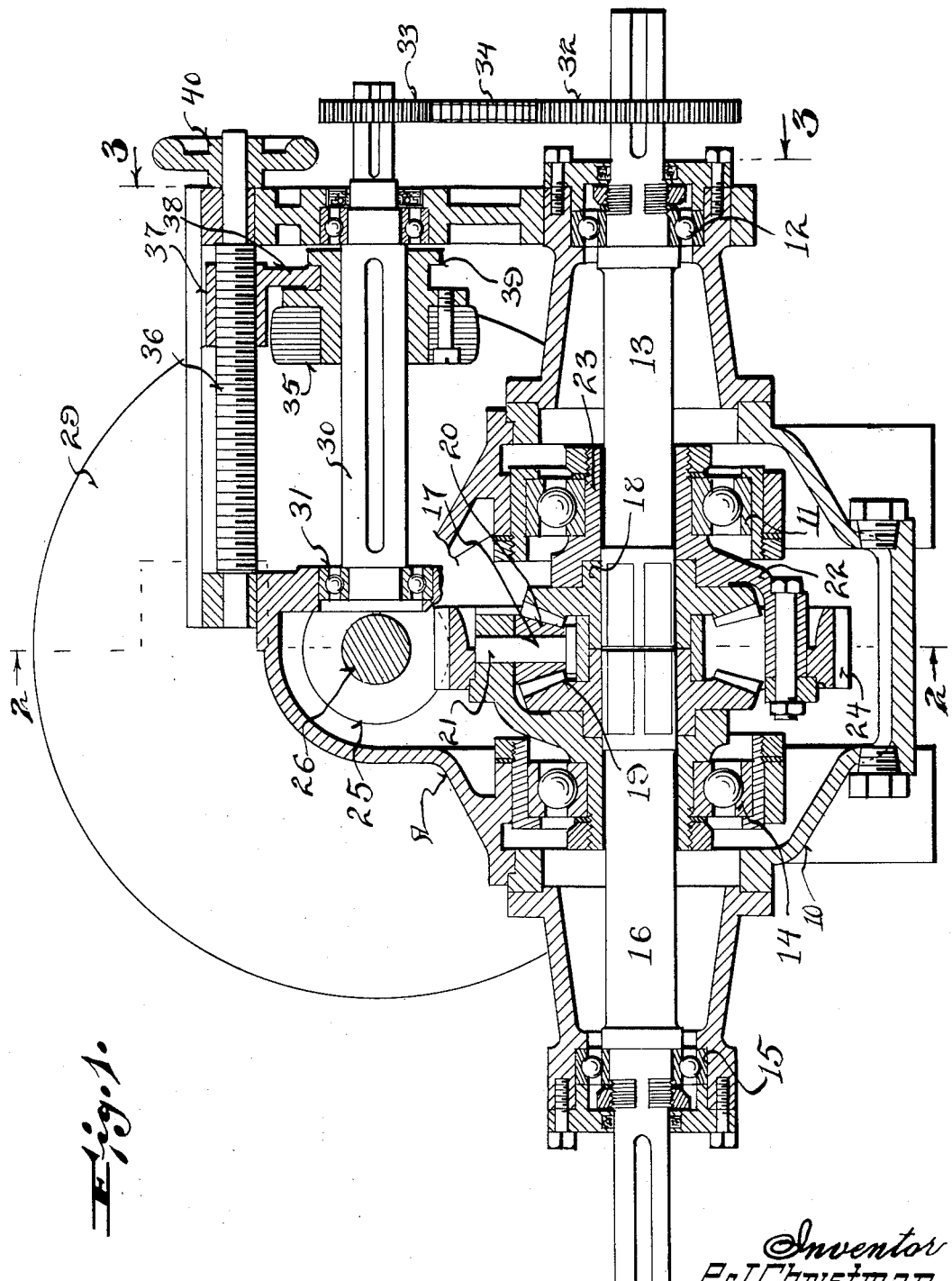

1,922,660

UNITED STATES PATENT OFFICE 1,922,660

POWER TRANSMISSION

Peter J. Christman, Green Bay, Wis.

Application November 11, 1932
Serial No. 642,170

1 Claim. (Cl. 74—34)

This invention appertains to a power transmission device, susceptible for use in connection with various types of machines, engines, etc., and more particularly to a novel variable speed transmission.

It is common practice to provide a variable speed transmission embodying a gear box having a series of pairs of different sized intermeshing gears, with means for rendering a certain selected pair of gears operative for the drive, and the other pairs of gears inoperative. This type of transmission is open to serious objections, amongst which may be listed the cost and the space occupied by the transmission, the difficulty contingent with the shifting of the gears, the noise of the meshing gears, and the fact that the number of different speeds obtained is limited by the number of pairs of different sized intermeshing gears employed.

It is therefore one of the primary objects of this invention to provide a variable speed transmission of a compact and durable construction, embodying alined drive and driven shafts operatively connected by a differential mechanism, with means for controlling the rotation of the cage housing carrying the pinions on the differential, whereby the speed of rotation of the driven or output shaft can be quickly and positively controlled.

A further object of my invention is the provision of novel and simple means for controlling the rotation of the cage or housing for the pinions of the differential, said means being manually controlled and embodying the use of a single hand wheel.

A further object of my invention is the provision of means for controlling the rotation of the cage or housing for the pinions of the differential embodying a cross shaft operatively connected to said cage, having secured thereto a large friction wheel with a smaller drive friction wheel actuated directly from the drive shaft of the transmission movable across the face of the large friction wheel by the use of a manually controlled mechanism, the use of the large and small friction wheels allowing an infinite number of different speeds to be had at the output end of the transmission.

A further salient object of my invention is the provision of means for actuating the controlling means for the differential cage or housing directly from the drive shaft, whereby the use of extraneous mechanisms, such as electric motors, hydraulic pumps, and the like, is entirely dispensed with.

A still further object of my invention is to provide a variable speed gear of the above character, which will be durable and efficient in use, one that will be simple and easy to manufacture, and one which can be placed upon the market and incorporated with a drive and driven shaft at a small cost.

With these and other objects in view, the invention consists in the novel construction, arrangement and formation of parts, as will be hereinafter more specifically described, claimed, and illustrated in the accompanying drawings, in which:

Figure 1 is a vertical longitudinal section through my improved variable speed gear.

Figure 2 is a transverse section through the gear taken on the line 2—2 of Figure 1, looking in the direction of the arrows.

Figure 3 is a detail section taken on the line 3—3 of Figure 1, looking in the direction of the arrows, illustrating a support for the jack shaft and hand-controlling mechanism.

Referring to the drawings in detail, wherein similar reference characters designate corresponding parts throughout the several views, the letter A generally indicates my improved transmission or variable speed gear, which comprises a casing 10 formed in any preferred or desirable manner. The casing 10 supports inner and outer bearings 11 and 12 at one end for a drive or input shaft 13. This shaft 13 may be driven from any suitable source of power and may be connected directly with the armature shaft of an electric motor or the crank shaft of an internal combustion engine, or the drive shaft 13 may be operated from a line power shaft by the use of a suitable pulley and belt, or equivalent mechanism.

The opposite end of the casing 10 supports inner and outer bearings 14 and 15 for the driven or output shaft 16. This shaft 16 leads to the point of use of the driving energy. As clearly shown in the drawings, the drive and driven shafts 13 and 16 are in alinement and are connected together by subtsantial conventional differential mechanism 17. This differential mechanism 17 embodies facing beveled gears 18 and 19, which are keyed respectively to the drive and driven shafts 13 and 16. Beveled pinions 20 mesh with the beveled gears 18 and 19, and these pinions are rotatably mounted on supporting stub shafts 21. These stub shafts 21 are in turn carried by the differential cage or housing 22, the ends of which carry bearing sleeves 23 supported by the inner bearings 11 and 14.

The outer face of the cage or housing 22 has secured thereto in any preferred manner a ring gear 24. The ring gear 24 meshes with a worm 25 forming a part of a cross jack shaft 26, which is journaled in suitable bearings 27 carried by said casing 10. Secured to one projecting end of the jack shaft 26 is the hub 28 of a relatively large friction wheel 29.

Arranged at right angles to the jack shaft 26 is a rotatably driven shaft 30. This shaft 30 is rotatably mounted in suitable bearings 31 carried by the casing 10. The shaft 30 is actuated from the drive or input shaft 13, and any desired means can be employed for this purpose. As shown, the shafts 13 and 30 are provided respectively with sprocket wheels 32 and 33, which can be connected together by a sprocket chain 34.

Feathered on the shaft 30 is a relatively small friction wheel 35, and this friction wheel engages at all times with the face of the relatively large friction wheel 29. Due to the connection of the friction wheel 35 with the shaft 30, the same can be moved longitudinally of said shaft 30 from the periphery of the large wheel 29 toward the hub of said wheel, and from the hub toward the periphery.

I preferably employ a simple manual means for shifting the friction wheel 35 along the shaft 30, and this means can comprise a rotatable feed screw 36 on which is mounted a feed nut 37. The feed nut 37 has formed thereon, or secured thereto, a shift yoke 38, which is rotatably received in a shift collar 39 formed on the friction wheel 35. A hand-wheel 40 can be secured to the feed screw 36 for bringing about the rotation thereof and consequent shifting of said friction wheel 35.

As shown in Figures 1 and 3 of the drawings, I provide a supporting bracket 41 for one end of the shaft 30, and one end of the feed screw 36. This supporting bracket 41 has formed on its lower end a split collar 42, which is adapted to be slipped over one end of the casing 10. The split collar 42 can be contracted about the casing by the use of a bolt 43 engaging ears 44 formed on the collar at the split portion thereof. This bracket projects upwardly and laterally from the collar 42, and carries the desired types of bearing supports for the shaft 30 and the feed screw.

In operation, say with a 1200 R.P.M. motor as driving the input shaft 13, the power would be transmitted to beveled gear 18 through pinions 20 over to beveled gear 19. If the cage or housing 22, to which the work or ring gear 24 is attached, is held stationary, so that the housing or cage holding the pinions does not turn, then shaft 16 will turn an equal number of revolutions as the drive shaft 13. If, however, the ring or worm gear 24 is made to rotate through the worm 25, which is driven by the friction disc 29, and the friction wheel employed is 35, then the output shaft 16 will vary in its speed depending upon how fast the worm 25 is causing it to rotate.

Thus it can be seen that the transmission embodies a differential arrangement in which the cage or housing that holds pinions 20, and to which the ring or worm gear 24 is attached, controls, or is variably controlled through the friction drive arrangement which actuates the worm 25. The drive, therefore, is a positive, infinitely variable control speed gear.

I prefer to run the entire unit in an oil bath so as to insure proper lubrication of all of the operating parts.

Changes in detail may be made without departing from the spirit or scope of this invention, but what I claim as new is:—

In a variable speed drive mechanism, an input shaft, an output shaft alined therewith, a pair of bevelled gears on the facing ends of said shafts, a rotatable, supported housing, rotatable pinions carried by the housing meshing with said bevelled gears, a ring worm gear connected with the housing, a cross shaft disposed at right-angles to the input and output shafts, a worm secured to the cross shaft engaging the ring worm gear, a friction disc secured to said cross shaft, a counter shaft disposed in spaced parallel relation to the input and output shafts and at right angles to the cross shaft means for positively driving the counter shaft from the input shaft, a friction pulley feathered on the counter shaft and movable over the face of the friction disc, and manual means for shifting said friction pulley.

PETER J. CHRISTMAN.